(12) United States Patent
Yamakawa (10) Patent No.: US 8,724,173 B2
(45) Date of Patent: May 13, 2014

(54) CONTROL APPARATUS, CONTROLLING METHOD, PROGRAM AND RECORDING MEDIUM

(71) Applicant: Canon Kabushiki Kaisha, Tokyo (JP)

(72) Inventor: Junichi Yamakawa, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/044,507

(22) Filed: Oct. 2, 2013

(65) Prior Publication Data

US 2014/0036285 A1 Feb. 6, 2014

Related U.S. Application Data

(62) Division of application No. 13/224,269, filed on Sep. 1, 2011, now Pat. No. 8,564,833, which is a division of application No. 12/181,913, filed on Jul. 29, 2008, now Pat. No. 8,031,366.

(30) Foreign Application Priority Data

Jul. 31, 2007 (JP) ................................. 2007-199492
Jul. 15, 2008 (JP) ................................. 2008-183901

(51) Int. Cl.
*H04N 1/60* (2006.01)
*G03F 3/08* (2006.01)
*G09G 3/36* (2006.01)
*G09G 5/02* (2006.01)

(52) U.S. Cl.
USPC ............... 358/1.9; 358/518; 345/90; 345/592

(58) Field of Classification Search
None
See application file for complete search history.

(56) References Cited

U.S. PATENT DOCUMENTS

| | | | |
|---|---|---|---|
| 4,882,621 A | 11/1989 | Suzuki et al. | |
| 5,699,067 A | 12/1997 | Brown et al. | |
| 5,841,898 A | 11/1998 | Liguori | |
| 6,578,201 B1 * | 6/2003 | LaRocca et al. | 725/86 |
| 7,046,254 B2 * | 5/2006 | Brown et al. | 345/592 |
| 7,283,277 B2 | 10/2007 | Li | |
| 7,424,152 B2 | 9/2008 | Ohta et al. | |
| 7,491,424 B2 | 2/2009 | Hersch et al. | |
| 7,796,282 B2 | 9/2010 | Yamakawa | |
| 7,843,606 B2 | 11/2010 | Hasegawa et al. | |
| 8,072,646 B2 | 12/2011 | Mestha et al. | |

(Continued)

FOREIGN PATENT DOCUMENTS

| | | |
|---|---|---|
| JP | 6-262821 A | 9/1994 |
| JP | 2006-050347 A | 2/2006 |
| JP | 2006-088529 A | 4/2006 |

*Primary Examiner* — Madelein A Nguyen
(74) *Attorney, Agent, or Firm* — Fitzpatrick, Cella, Harper & Scinto (57) ABSTRACT

A problem of the present invention is to provide a control apparatus, a controlling method, a program, and a recording medium which can print by using at least one or more special colors in addition to four colors of Cyan, Magenta, Yellow, and Black. To solve the above problem, the control apparatus according to the present invention includes analyzing unit that provides command analysis for a CMYK plate and a clear toner plate, generating unit that generates image data of the CMYK plate based on a result of the command analysis by the analyzing unit, and embedding unit that embeds a clear toner attribute obtained by analyzing the clear toner plate in an attribute flag accompanying each of pixels of the image data of the CMYK plate, which is generated by the generating unit.

9 Claims, 12 Drawing Sheets

(56) References Cited

U.S. PATENT DOCUMENTS

| | | |
|---|---|---|
| 8,218,155 B2 | 7/2012 | Kovacs |
| 8,331,009 B2 * | 12/2012 | Sacher ............................ 359/290 |
| 8,396,294 B2 * | 3/2013 | Enomoto et al. .............. 382/181 |
| 2003/0007164 A1 | 1/2003 | Lee et al. |
| 2003/0052836 A1 | 3/2003 | Matsumoto et al. |
| 2003/0202196 A1 | 10/2003 | Ooki |
| 2004/0233463 A1 | 11/2004 | Hersch et al. |
| 2005/0243341 A1 | 11/2005 | Ng |
| 2005/0280847 A1 | 12/2005 | Cairns et al. |
| 2006/0187505 A1 | 8/2006 | Ng et al. |
| 2007/0140710 A1 | 6/2007 | Okano |
| 2007/0164953 A1 | 7/2007 | Huang et al. |
| 2007/0176944 A1 | 8/2007 | Brown et al. |
| 2007/0211269 A1 | 9/2007 | Patrick et al. |
| 2007/0216921 A1 | 9/2007 | Watanabe |
| 2008/0013114 A1 | 1/2008 | Hasegawa et al. |
| 2008/0068314 A1 | 3/2008 | Hsieh et al. |
| 2008/0068630 A1 | 3/2008 | Itagaki |
| 2008/0079971 A1 | 4/2008 | Liu et al. |
| 2008/0144141 A1 | 6/2008 | Tai et al. |
| 2008/0193860 A1 | 8/2008 | Hains |
| 2008/0308564 A1 | 12/2008 | Hall et al. |
| 2009/0015703 A1 * | 1/2009 | Kim et al. ................ 348/333.12 |
| 2009/0016776 A1 | 1/2009 | Priebe et al. |
| 2009/0057420 A1 | 3/2009 | Onoda et al. |
| 2009/0109510 A1 | 4/2009 | Varga |
| 2009/0219554 A1 | 9/2009 | Freyer et al. |
| 2010/0033778 A1 | 2/2010 | Otake et al. |
| 2010/0079388 A1 | 4/2010 | Ohnishi et al. |
| 2011/0096100 A1 | 4/2011 | Sprague |
| 2011/0317187 A1 | 12/2011 | Yamakawa |

* cited by examiner

CONTROL APPARATUS, CONTROLLING METHOD, PROGRAM AND RECORDING MEDIUM

This application is a divisional of U.S. patent application Ser. No. 13/224,269, filed Sep. 1, 2011, which is a divisional of U.S. patent application Ser. No. 12/181,913, now U.S. Pat. No. 8,031,366, filed Jul. 29, 2008. The contents of each of the foregoing applications are incorporated by reference herein.

BACKGROUND OF THE INVENTION

1. Field of the Invention

The present invention relates to a control apparatus, a controlling method, a program and a recording medium which digitally generates and controls image data for forming an image on a sheet by an image forming apparatus, more specifically, to a control apparatus, a controlling method, a program and a recording medium which can print by using at least one or more special colors in addition to four colors of Cyan, Magenta, Yellow, and Black.

2. Description of the Related Art

In recently years, the utility value of a digital printing technique has been securely increased in an on-demand print market and a small number of copies print market. Particularly, the full-color print using an electrophotographic technique is more superior to other printing techniques in the productivity, a print cost, the maintenance-easiness, and the like, and the market of the full-color print has been quickly expanded.

In the electrophotographic technique, not only the full-color print by the electrophotographic print using conventional toners of four colors of C, M, Y and K, but also a multi-color printing method additionally using a special toner have taken attention, and a special print market, whose on-demand performance and immediacy are high, has been coming in view.

The print using the special toner, for example, a clear toner also takes attention. While a method, which uniformly prints a whole area of a sheet and increases the brilliance, is general as a printing method using the clear toner, the need for a printing method, which partially prints a sheet, has been also being increased.

Japanese Patent Laid-Open No. 6-262821 proposes such a method which prints by using the clear toner, which is used as a water mark for information on devices, in addition to the four color toners of C, M, Y, and K. There also exists an advanced technique for printing by using a special color toner in addition to the four color toners of C, M, Y, and K.

As described above, the new added-value, which is different from that of the normal digital print, becomes able to be obtained by using the special color toner also including the clear color, and it becomes possible to further expand the world of the digital print.

SUMMARY OF THE INVENTION

However, since specific information is necessary to generate a special color plate (data for printing with the special color toner) from an image, there exists such a problem that the special color plate can not be generated from an arbitrary image of a user.

When the special color toner is used, since the process is executed with the special color toner, circuit sizes of a system for transferring a video signal and a system for processing an image are enlarged. This is a problem.

In this case, while the special color plate can be easily confirmed on an application, it is necessary to change the designated special color to switch so that the clear toner plate (data for printing with the clear toner) can be displayed or printed with the CMYK or the RGB. This is a problem.

In the present invention, to solve the above problems, the control apparatus according to the present invention includes analyzing unit that provides command analysis for a CMYK plate and a clear toner plate, generating unit that generates image data of the CMYK plate based on a result of the command analysis by the analyzing unit, embedding unit that embeds a clear toner attribute obtained by analyzing the clear toner plate in an attribute flag accompanying each of pixels of the image data of the CMYK plate, which is generated by the generating unit.

According to the present invention, such a printing becomes able to be executed that the special color plate, whose design is desired by a user, is generated from print data in which the defined special color plate is used, and the special color toner is used. In this case, when the special color toner is not used, the printing is processed as a normal printing, so that the special color plate can be confirmed by the re-RIP on a monitor.

Since the special color plate and the clear toner plate are generated as being embedded in an attribute bit which is also used in the printing of the CMYK system, the printing by the special color and the clear toner can be executed by a PDL controller for the printing in the CMYK system.

Further features of the present invention will become apparent from the following description of exemplary embodiments (with reference to the attached drawings).

DESCRIPTION OF THE EMBODIMENTS

Exemplary Embodiment 1

[Image Processing System]

Figure 1:
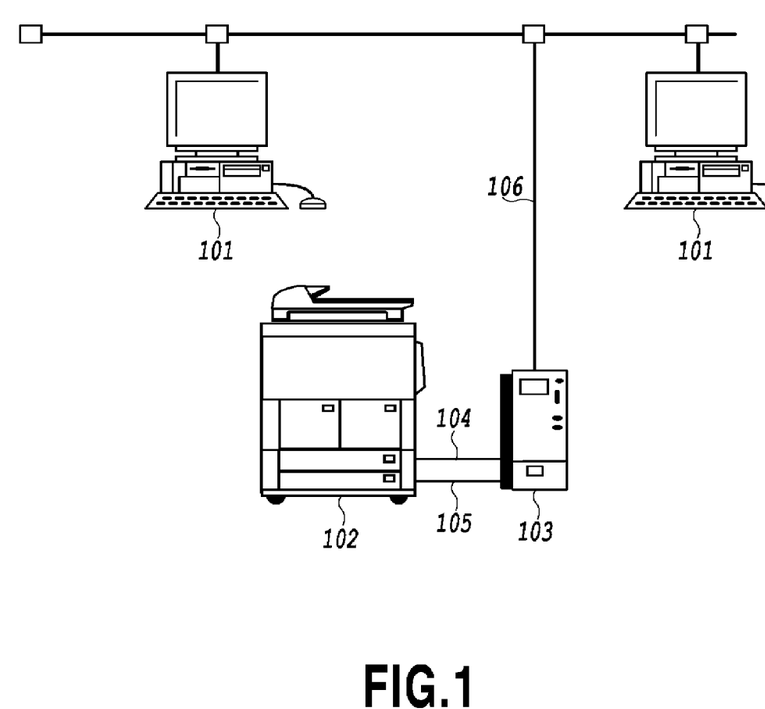
FIG. 1 is a diagram illustrating an image processing system according to an exemplary embodiment of the present invention.

FIG. 1 illustrates an image processing system according to an exemplary embodiment. A client computer 101 is used for a user to generate text data with an application. A printing apparatus 102 is a copying machine which includes a plurality of functions and which is also referred to as a so-called multi function printer in an electrophotographic method. A PDL (Page Description Language) controller 103 interprets data generated by the client computer 101 and PDL data outputted when being printed from a printer driver. The PDL controller 103 develops the data generated by the client computer 101 to a bit map to transmit the data to the printing apparatus 102. A code 104 denotes a control interface cable. Through the control interface cable 104, data to be printed is transmitted to the printing apparatus 102, and a control command is communicated which is used when the data to be printed is scanned. A code 105 denotes a video interface cable. Developed video data is transmitted to the printing apparatus 102 through the video interface cable 105. A code 106 denotes a LAN cable of the PDL controller 103. The client computer 101 and the PDL controller 103 are connected to a network.

[Printing Apparatus]

Figure 2:
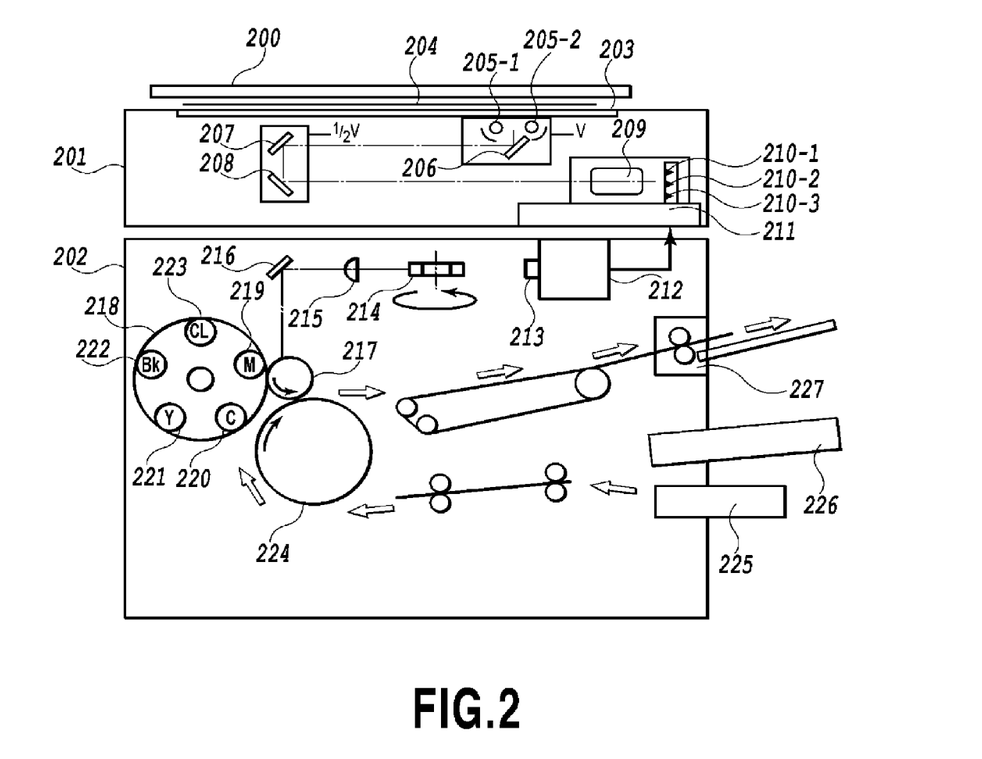
FIG. 2 is a diagram illustrating a cross-section view of a printing apparatus.

FIG. 2 illustrates a general view of the printing apparatus 102. In FIG. 2, an image scanner unit 201 reads a manuscript, and processes a digital signal. A printer unit 202 prints out an image on a sheet with full-color, the image corresponding to a manuscript image read by the image scanner unit 201.

In the image scanner unit 201, a code 200 denotes a mirror surface pressure plate. A manuscript 204 on a manuscript stage glass (platen) 203 is illuminated by lamps 205-1 and 205-2. A light radiated by the lamps 205-1 and 205-2 is led to mirrors 206, 207, and 208, and is focused by a lens 209 on three lines of solid state imaging element sensors (CCD) 210-1, 210-2, and 210-3. Three image signals of red (R), green (G), and blue (B) is transferred as full color information of the manuscript 204 to a signal processing unit 211. Meanwhile, the lamps 205-1 and 205-2 and the mirror 206 mechanically move in a vertical direction to an electrical scanning (main scanning) direction of a line sensor at a velocity (v) to scan (sub-scan) a whole area of the manuscript. The mirror 207 and the mirror 208 mechanically move in a vertical direction to the electrical scanning (main scanning) direction of the line sensor at a velocity (½ v) to scan (sub-scan) the whole area of the manuscript. Here, the manuscript 204 is read at a resolution of 600 dpi (dots/inch) in both of the main scanning and the sub-scanning. The read image signal is accumulated in internal data accumulating means of the signal processing unit 211 for each manuscript page.

The image signal internally accumulated in the signal processing unit 211 is electrically processed for each pixel, is separated to each component of Magenta (M), Cyan (C), Yellow (Y), and Black (Bk), and is transferred to the printer unit 202. A clear pattern generating unit is internally included in the signal processing unit 211, generates clear image data (CL) for each pixel, and also transfers the clear image data (CL) to the printer unit 202.

The transferred image signals of M, C, Y, Bk, and CL are transferred to a laser driver 212. The laser driver 212 modulation-drives a semiconductor laser 213 according to the transferred image signals. Laser light scans a photoconductive drum 217 through a polygon mirror 214, an (f-θ) lens 215, and a mirror 216. Here, the image signals are written in a resolution of 600 dpi (dots/inch) for both of the main scanning and the sub-scanning as in the reading.

A rotating developer 218 includes a Magenta developing unit 219, a Cyan developing unit 220, an Yellow developing unit 221, a Black developing unit 222, and a Clear (transparent) developing unit 223. The five developing units denoted by the codes 219 to 223 alternately contact the photoconductive drum 217 to develop an electrostatic image formed on the photoconductive drum 217 with each color toner.

A transcribing drum 224 wraps a sheet delivered from a sheet cassette 225 or a sheet cassette 226 around itself, and transcribes the image developed on the photoconductive drum 217 to the sheet.

As described above, after the five colors of M, C, Y, Bk, and clear (transparent) are sequentially transcribed, the sheet passes through a fixing unit 227, and is fixed with the toners to be ejected.

[PDL Controller]

Figure 3:
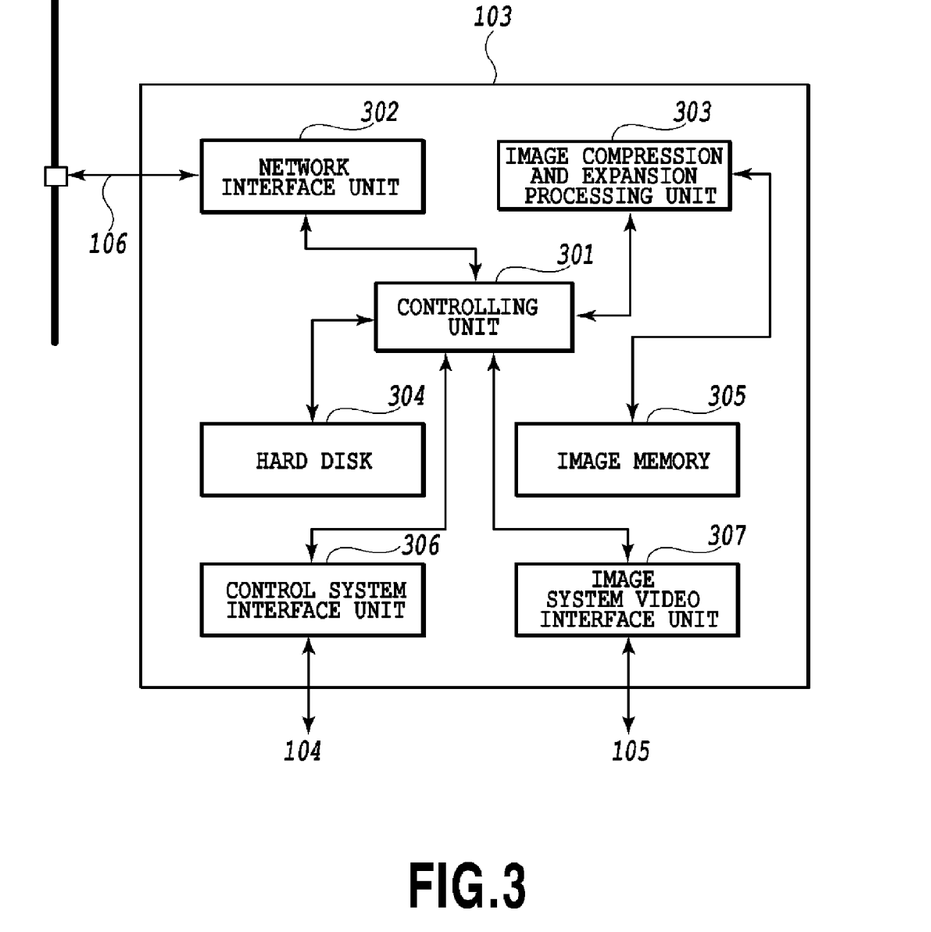
FIG. 3 is a block diagram of a PDL controller.

FIG. 3 illustrates a diagram of the PDL controller 103.

When the printing is executed from the client computer 101, a printing job generated by the client computer 101 is transferred to the PDL controller 103 through a network. In the case of the present exemplary embodiment, this printing job is the PDL data described by a page description language (PDL: Page Description Language). In the PDL controller 103, the PDL data transferred from the client computer 101 is received through a network interface unit 302 to be developed to raster image data for each band by a controlling unit 301. The image data is compressed by an image compression and expansion processing unit 303 to be written in an image memory 305. The printing is instructed to a device controller in the printing apparatus 102 through a control system interface unit 306. The compressed image data read from the image memory 305 is expanded by the image compression and expansion processing unit 303. Next, the image data is transferred to the not-illustrated device controller in the printing apparatus 102 through an image system video interface unit 307, and the image is formed to be printed.

[Setting a Clear Toner Color]

When the clear toner is used, it is necessary to register the clear toner color as a custom color in the special color registering setting when the special color is set in the color setting of the PDL controller 103. Here, the "clear" means that a specific color tone is not included. When setting the special color registering, the manager of the PDL controller 103 sets a name of the clear toner color as the custom color to define CMYK values (color values). In this case, a group name is designated as Clear Toner.

For example, the clear toner color can be defined such as a name of the custom color: CCLR, the CMYK values: Cyan 40, Magenta 30, Yellow 30, and Black 0, the group: Clear Toner. Here, it is possible to define a plurality of the clear toner colors. The data generated for the clear toner plate can be used not only for the printing with the clear toner but also for the normal printing with the setting of the printer driver. In this case, a plurality of the clear toner colors are defined in which the different CMYK values are set, and an alternative color of the CMYK for the special color toner can be selected according to colors of an output image.

[Generating a Printing Job]

When the clear toner is used, not an office application of the RGB system, but a DTP application is used in which not only the CMYK plate (data for printing with the CMYK toners), but also the special color plate can be generated. The previously-defined special color is designated for a part in which the clear toner needs to be used. An over-printing attribute is added to an object to be generated. The special color plate includes eight bits of tones like the CMYK plate, and can be expressed in a multi-value.

[Print Setting for Clear Toner Printing]

Figure 4:
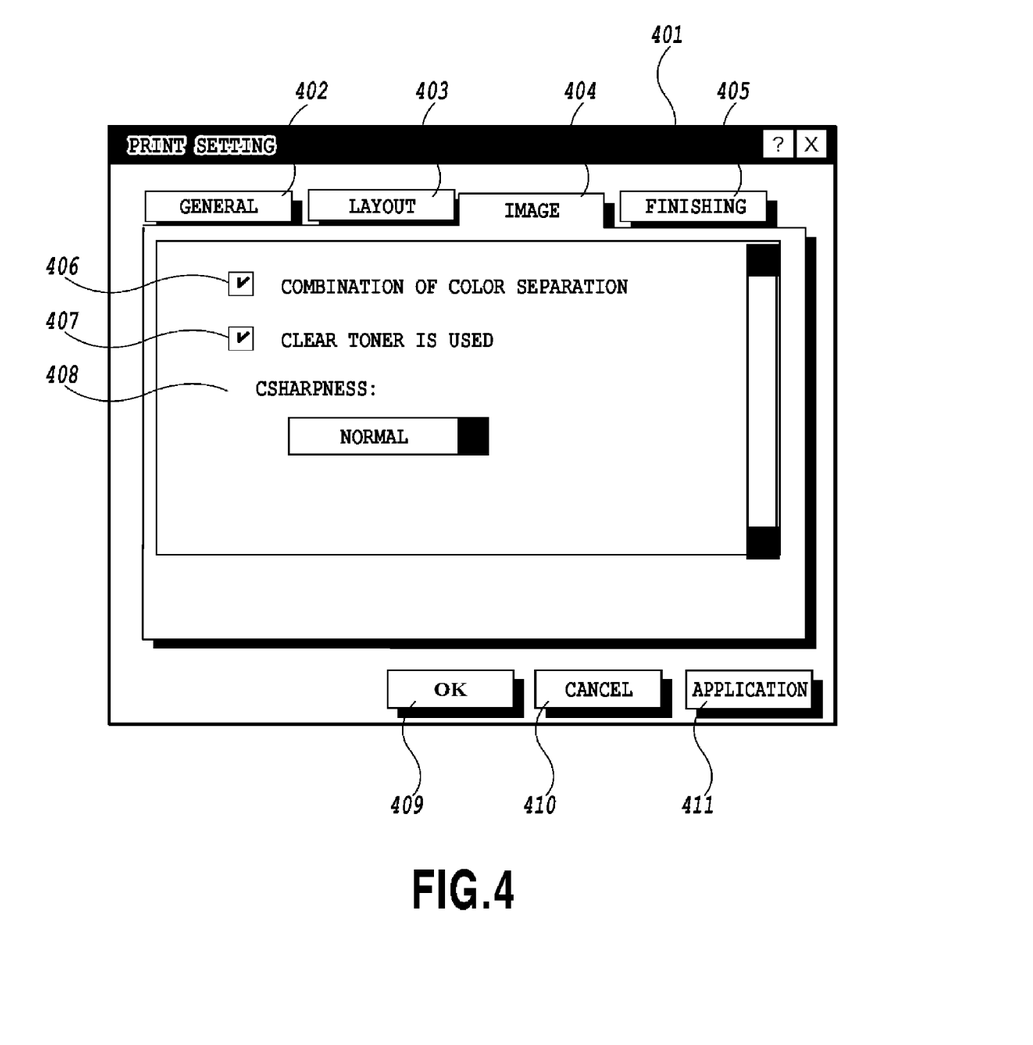
FIG. 4 is a diagram illustrating the UI of the print setting for a print driver.

FIG. 4 describes the print setting when the printing is executed by using the clear toner. A code 401 denotes a print setting window of the printer driver which is stored in the client computer 101. The print setting window 401 includes four tabs of a general 402, a layout 403, an image 404, and a finishing 405. The print setting window 401 also includes an OK button 409, a cancel button 410, and an application button 411. FIG. 4 illustrates such a case that the image 404 tab is selected, and displays each setting of [combination of color separation] 406, [clear toner is used] 407, and [sharpness] 408. When the clear toner is used, divided plate data including the special color plate designated as the clear toner color is generated by the application on the client computer 101. Next, when the OK button 409 is pushed down with the print setting for the [combination of color separation] 406: ON, and the [clear toner is used] 407: ON, the printing is executed from the printer driver.

[RIP Process Including Clear Toner Plate]

The printing job including the clear toner plate transmitted from the client computer 101 is the divided plate PDL data configured with the CMYK plate and the special color plate including the clear toner plate. This divided plate data is transmitted to the PDL controller 103 to be RIP-processed.

Figure 5:
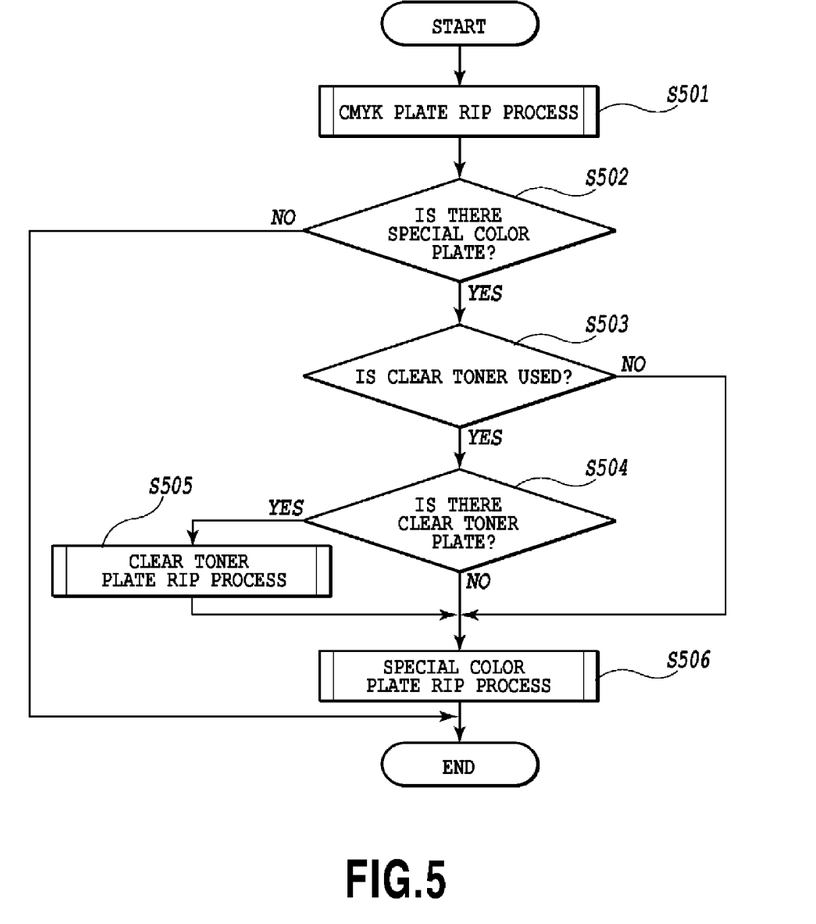
FIG. 5 is a flowchart of an RIP process in the PDL controller.

FIG. 5 is a flowchart of the RIP (Raster Image Processing) process including the clear toner plate. Here, the controlling unit 301 reads a program for executing the flowchart of FIG. 5 which is stored in the controlling unit 301 of the PDL controller 103, a hard disk 304, or the image memory 305 and executes the flowchart illustrated in FIG. 5. Here, when the [combination of color separation] 406 is OFF in the print setting, the transmitted divided plate data is not combined, and is directly printed in a gray scale by the number of the pieces of divided plate data.

In the following description, it is assumed that the [combination of color separation] 406 is ON. At step S501, the CMYK plate RIP process is executed. At step S502, when there exists the special color plate, the process proceeds to step S503. At step S502, when there does not exist the special color plate, the RIP process is terminated. At step S503, when the [clear toner is used] 407 is ON for the job in the print setting which is set in the client computer 101, the process proceeds to step S504. At step S503, when the [clear toner is used] 407 is OFF in the print setting, the process proceeds to the special color plate RIP process of step S506. At step S504, it is determined whether or not the color defined as the clear toner color is used for the special color. At step S504, when it is determined that the clear toner plate is used, the process proceeds to the clear toner plate RIP process of step S505. At step S504, when it is determined that the clear toner plate is not used, the process proceeds to the special color plate RIP process of step S506.

[CMYK Plate RIP Process]

Figure 6:
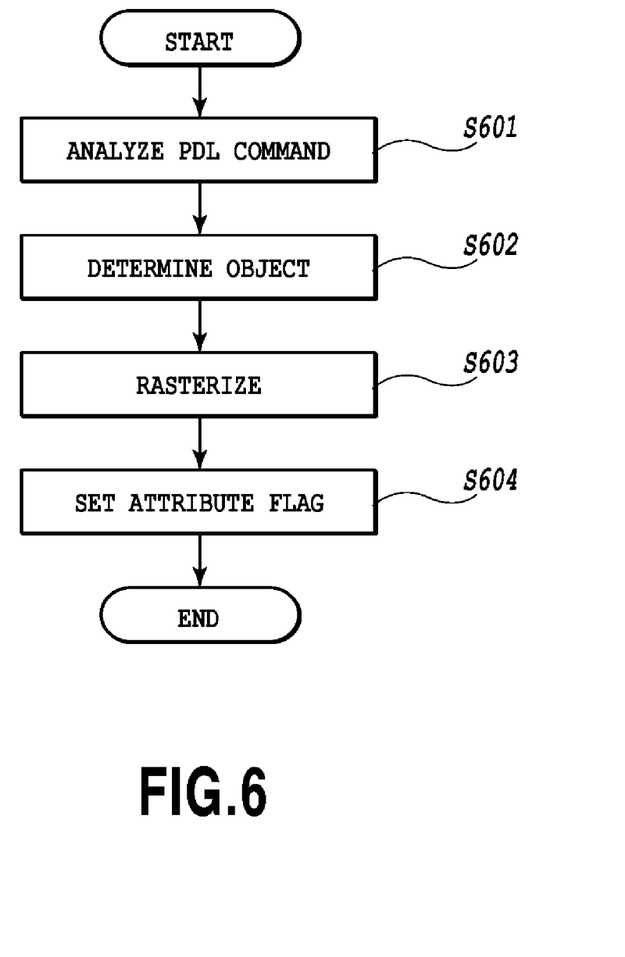
FIG. 6 is a flowchart of the RIP process according to the present invention.

FIG. 6 illustrates a flowchart of step S501 at which the CMYK plate RIP process is executed. Here, the flowchart illustrated in FIG. 6 is executed by the not-illustrated CPU of the image processing system according to the present invention.

At step 601, a command of the divided plate data of the CMYK plate, which is generated by the printer driver of the client computer 101, and is transmitted to the PDL controller 103, is analyzed. At step 602, the object to be RIP-processed is determined from a result of the command analysis. The determined objects correspond to three types of a character, an image, and a graphics. At step 603, the rasterizing is executed, and the output image data is generated. At step 604, an attribute flag is set for each of pixels of the output image data of the CMYK plate based on a result of the processes of step S602 and step S603.

[Attribute Flag]

The attribute flag is information configured with eight bits in which the attribute information is embedded for each pixel of the output image data. The attribute flag is transmitted as synchronized with the image data from the image system video interface unit 307 to the printing apparatus 102 through the video interface cable 105.

The attribute flag is configured with the attribute information of Bit 0-Bit 1, Bit 3, Bit 4, and Bit 6. Here, the Bit 0-Bit 1 includes an object attribute (character 00, image 01, and graphics 10). The Bit 3 includes a ground attribute ("1" is set in a background unit). The Bit 4 includes a high-definition character process flag ("1" is set when a high-definition character image process is executed as a character for an object). The Bit 6 includes a clear toner attribute ("1" is set when the clear toner is used).

Based on the attribute information of the above attribute flag, the device controller in the printing apparatus 102 executes the optimum image processing, for example, changes a screen setting for each object attribute. The CMYK image data is once irreversibly compressed by the image compression and expansion processing unit 303 in the PDL controller 103, and is image-expanded to be transferred to the printing apparatus 102. However, the attribute information is transferred to the printing apparatus 102 without being compressed.

[Special Color Plate RIP Process]

Figure 7:
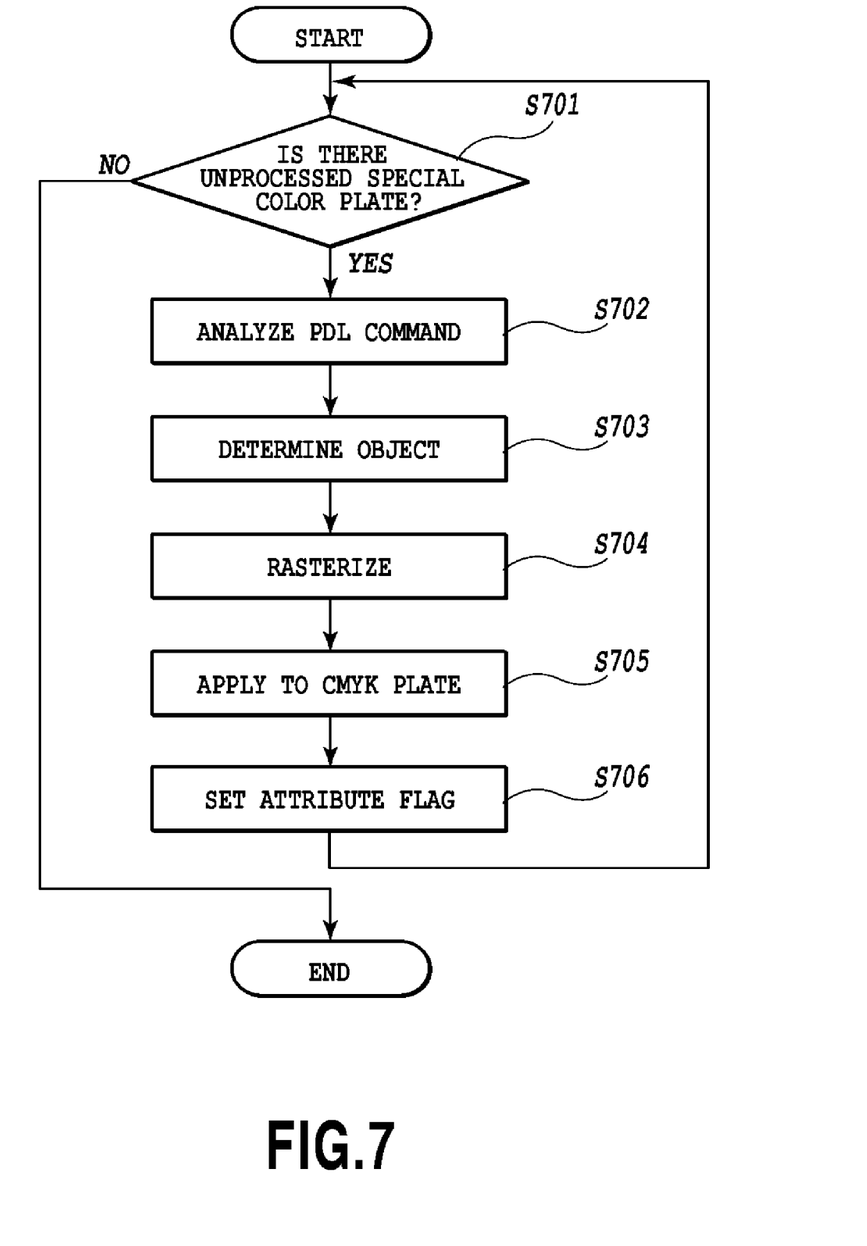
FIG. 7 is a flowchart of the RIP process according to the present invention.

FIG. 7 illustrates a flowchart of step S506 at which the special color plate RIP process is executed. Here, the flowchart illustrated in FIG. 7 is executed by the not-illustrated CPU of the image processing system according to the present invention.

At step S701, it is checked whether or not there exists the unprocessed special color plate, and when there exists the unprocessed special color plate, the process proceeds to step S702, and when there does not exist the unprocessed special color plate, the process is terminated. At step S702, a command of the special color plate data transmitted to the PDL controller 103 is analyzed. At step S703, the object to be RIP-processed is determined from a result of the command analysis. The determined objects correspond to three types of a character, an image, and a graphics. At step 704, the rasterizing is executed, and the output image data of the special color plate is generated. At step S705, the image data of the special color plate is applied to the output image data of the CMYK plate based on the CMYK values defined by the special color. At step S706, the attribute flag is set for each of pixels of the output image data of the CMYK plate based on a result of the processes of step S703 and step S704, and the process returns to step S701.

[Clear Toner Plate RIP Process]

Figure 8:
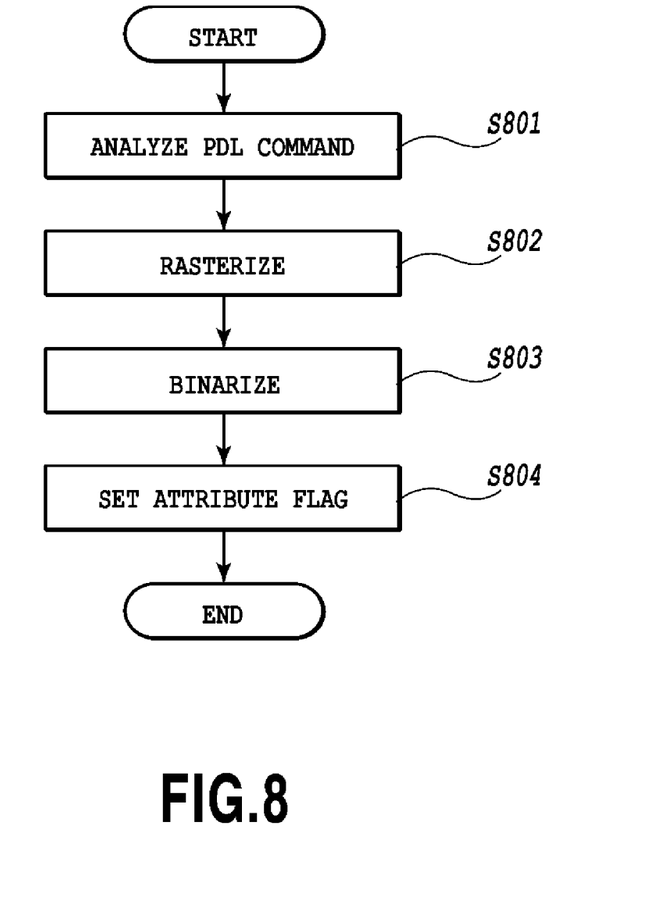
FIG. 8 is a flowchart of the RIP process according to the present invention.

FIG. 8 illustrates a flowchart of step S505 at which the clear toner plate RIP process is executed. Here, the flowchart illustrated in FIG. 8 is executed by the not-illustrated CPU of the image processing system according to the present invention.

At step S801, a command of the clear toner plate data transmitted to the PDL controller 103 is analyzed. At step S802, the rasterizing of the clear toner plate data is executed, and the output image data of the clear toner plate is generated. In the clear toner plate process, since the output image is not applied to the CMYK plate, the object determining process is not necessary. At step S803, the binarizing is executed for the above output image data of the clear toner plate. The binarizing is such a simple binarizing that "1" is set for the pixel including the clear color data in the rasterizing of step S802. At step S804, a result of the binarizing is set to the clear toner attribute of the Bit 6 of the attribute flag accompanying each of pixels of the output image data of the CMYK plate based on a result of the process of step S803.

Meanwhile, the output image data of the CMYK plate is the image data generated by a rasterizing process at step S603 of FIG. 6.

The output image data of the CMYK plate, which is accompanied by the clear toner attribute, is outputted to the printing apparatus 102.

Meanwhile, at step S804, the clear toner attribute is not set to the output image data of the CMYK plate, but a result obtained by binarizing the output image data of the CMYK plate and the output image data of the clear toner plate may be transmitted to the printing apparatus 102. In this case, in the printing apparatus 102, the clear toner attribute is set to the output image data of the CMYK plate.

[Override of Print Setting and Re-RIP Process]

By setting the printer driver when printing by using the PDL controller 103, the printing is executed in the printing apparatus 102, and also, the PDL data can be left in a hard disk 304 of the PDL controller 103. In this case, the user can executes the followings by accessing with a web browser from the client computer 101 to the PDL controller 103. That is, the user can change the setting of the printing job transmitted by itself (override of the print option), cause only the RIP to be executed, delete the RIP-processed image, and execute the RIP again. The printing job including the RIP-processed image can be previewed from the web browser.

Figure 11:
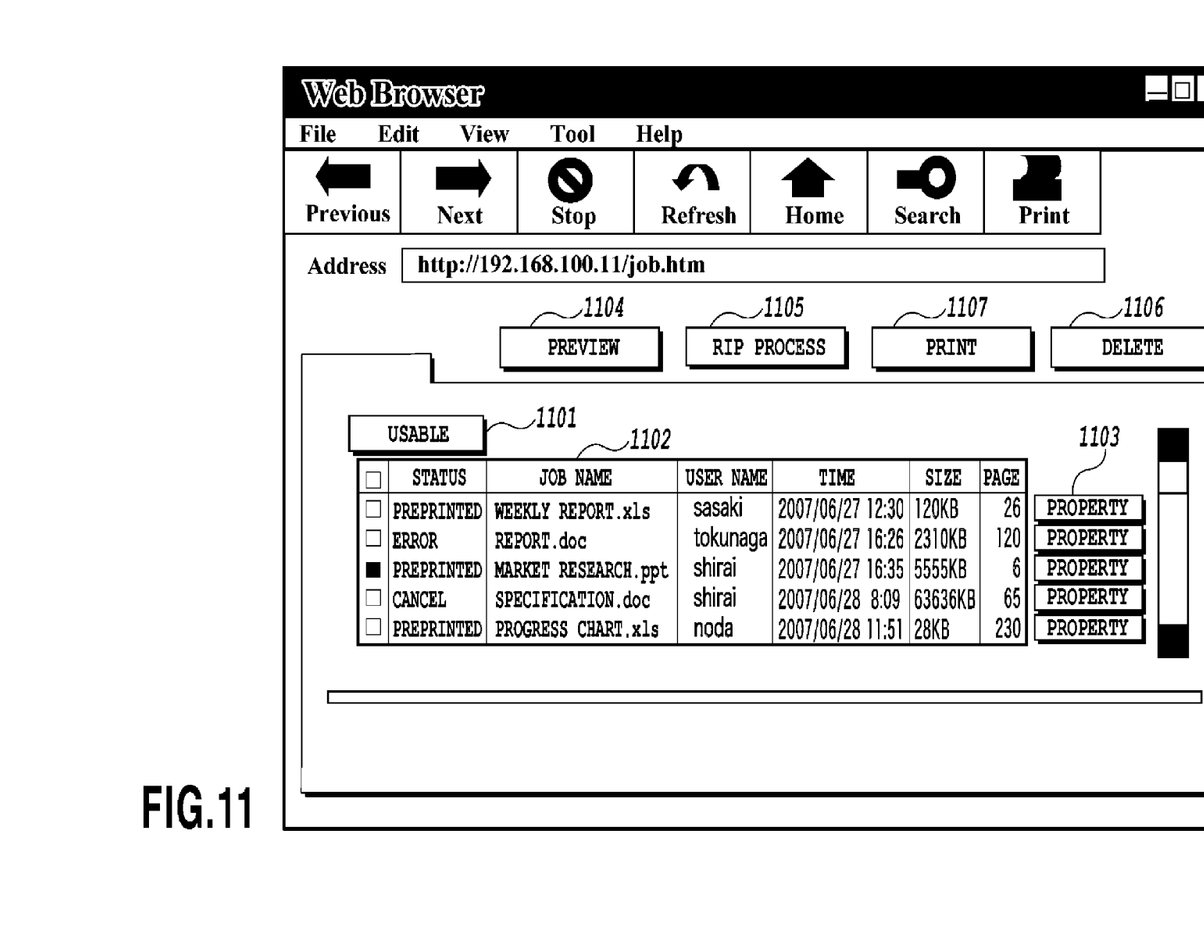
FIG. 11 is a diagram illustrating a display of a web browser according to an exemplary embodiment 1.

FIG. 11 illustrates a display of the web browser when accessing the PDL controller 103. A code 1101 denotes a status display of the PDL controller 103, and a code 1102 denotes a list of the jobs for printing with the PDL controller 103. For example, in FIG. 11, the third upper job is selected in the list 1102 of the jobs.

A code 1103 denotes a button displaying the property of the jobs. By pushing down the property button 1103, the print setting can be changed. A code 1104 denotes a preview button for previewing the selected job. A code 1105 denotes an RIP process button for executing the RIP of the PDL data. A code 1106 denotes a delete button, and a code 1107 denotes a print button.

When previewing the job for setting to use the clear toner, the clear toner plate is applied to the attribute information, but is not applied to the CMYK image, so that the clear toner plate is not displayed. However, if the setting of the [clear toner is used] 407 is changed to OFF by pushing down the property button 1103, and the preview is executed after re-RIP process by pushing down the RIP process button 1105, the clear toner becomes the followings. That is, since the clear toner plate is applied to the CMYK image as a color previously defined for processing the special color, the clear toner plate is also displayed in a monitor like the CMYK plate.

[Generate Clear Toner Plate]

Figure 12:
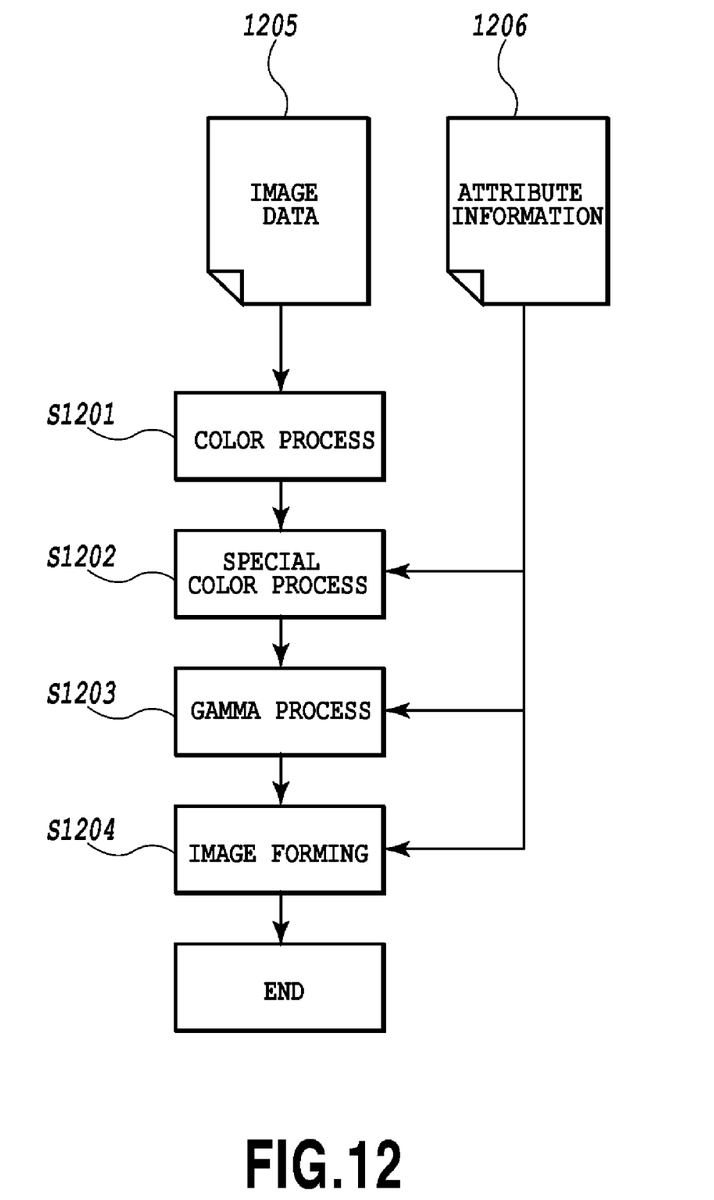
FIG. 12 is a flowchart of an image processing in a printing apparatus according to the exemplary embodiment 1.

FIG. 12 illustrates a flowchart for processing the image in the printing apparatus 102. Here, the flowchart illustrated in FIG. 12 is executed by the not-illustrated CPU of the image processing system according to the present invention.

In the process illustrated in FIG. 12, first, image data 1205 generated by the PDL controller 103 and attribute information 1206 accompanying to the image data 1205 are inputted. The attribute information 1206 is used to execute the optimum image process in each image processing module.

At step S1201, the color is changed by the color process in the printing apparatus side. Next, at S1202, when the clear toner attribute flag of the Bit 6 of the attribute information is "1", the clear toner component is extracted from the signals C, M, Y, and K. First, a total amount of toner of C, M, Y, and K is obtained for each pixel. The total amount of toner is an amount of toner transcribed to a sheet for each pixel, which is obtained from a total amount of signal of the four colors of C, M, Y, and K. Normally, the total amount of toner is expressed as a percentage value in the case that the maximum value of a simple color is 100%. When the image signal is expressed as an integer of eight bits, the maximum value of a simple color is 255, so that the total amount of toner is obtained by multiplying the addition value of C, M, Y, and K by 100/255.

For example, if the image signal of eight bits is C=80, M=95, Y=140, and K=110 for one pixel, the total amount of toner=(C+M+Y+K)×100/255=167% ... (1).

Normally, the upper limit value of the total amount of toner is generally around 200-280%, and is determined by the imaging process. In the present invention, it is further required that the total amount of toner is equal to or less than the upper limit value after a clear toner layer is formed.

Here, when it is assumed that the upper limit value is 240%, it can be considered that the difference between a value of the formula (1) and the upper limit value is a density ratio which is allowed for the clear toner layer, so that the allowed value=240−167=73% ... (2). When the clear toner attribute flag of the Bit 6 of the attribute information is not ON, the clear toner component is not generated, and data of the inputted C, M, Y, and K is directly outputted.

When an amount of C, M, Y, K, and CL (clear toner) is determined, in a gamma process at step S1203, the optimum gamma process for this printer is applied to each color.

Next, when the image is formed at step S1204, the image forming process is applied to each color. The image forming process corresponds to a screen process and an error diffusion process.

In the present exemplary embodiment, there exists such an advantageous effect that the clear toner plate, whose design is desired by the user, is generated from the print data in which the special color plate defined as the clear toner is used, and the printing can be executed by using the special color toner. In this case, when the clear toner is not used, the printing is normally executed, so that there also exists such an advantageous effect that it is possible to confirm the clear toner plate on the monitor with the re-RIP process, and to print with the CMYK colors.

Since the clear toner plate is generated as being embedded in the attribute bit which is also used in the printing of the CMYK system, there exists such an advantageous effect that the clear toner plate can be printed by the conventional PDL controller of the CMYK without increasing the video signal.

Exemplary Embodiment 2

While it is assumed that a color of the special color toner other than CMYK is only one clear toner color in the exemplary embodiment 1, if the printing apparatus 102 can process, the two or more special colors can be also applied.

[RIP Process Including Special Color Plate]

The printing job including a plurality of the special color plates transmitted from the client computer 101 is the divided plate PDL data configured with the CMYK plate, the clear toner plate, and the special color plate including a fluorescence toner plate (data for printing with a fluorescence toner). This divided plate data is transmitted to the PDL controller 103 to be RIP-processed. Here, the special color of the special color plate is previously defined as in the exemplary embodiment 1.

Figure 9:
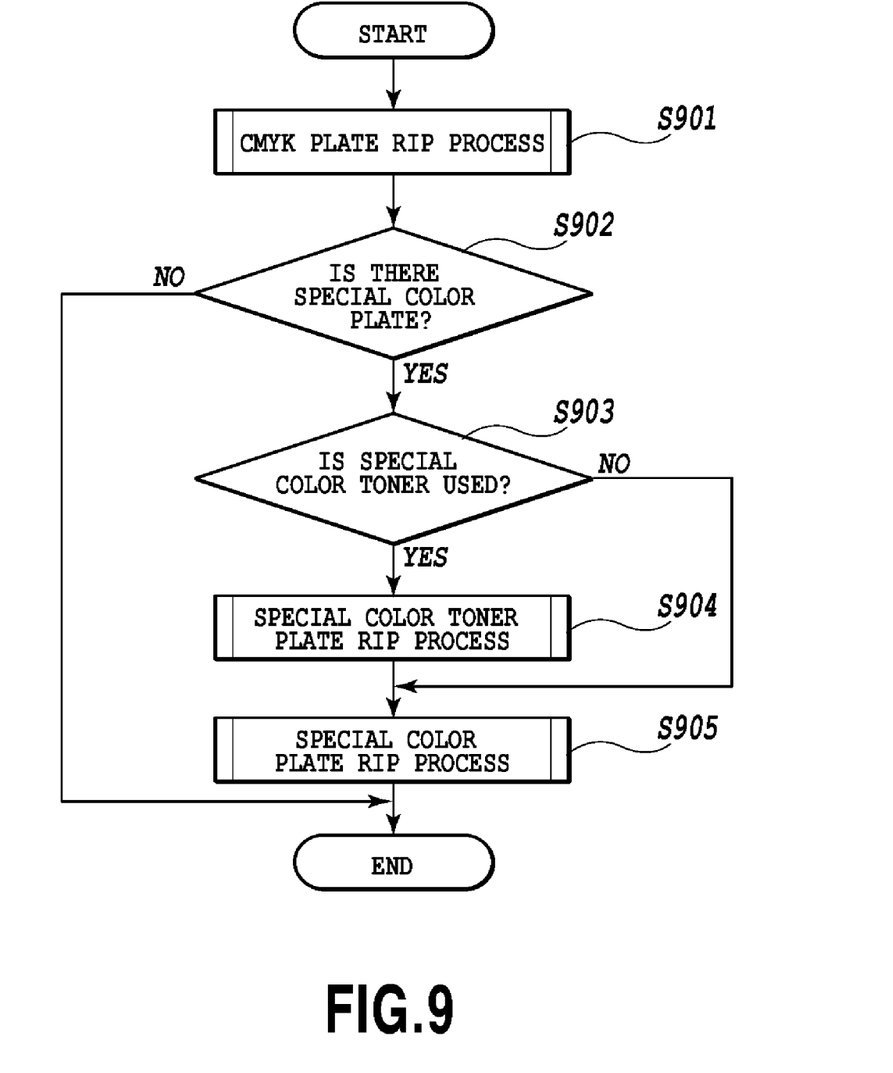
FIG. 9 is a flowchart of the RIP process of an exemplary embodiment 2.

FIG. 9 is a flowchart of the RIP process including the special color plate. Here, the flowchart illustrated in FIG. 9 is executed by the not-illustrated CPU of the image processing system according to the present invention.

At step S901, the CMYK plate RIP process is executed. At step S902, when there exists the special color plate, the process proceeds to step S903, and when there does not exist the special color plate, the RIP process is terminated. At step S903, when [special color toner is used] is ON in the print setting for the job, the process proceeds to step S904. At step S903, when the [special color toner is used] is OFF in the print setting for the job, the process proceeds to the special color plate RIP process of step S905. At step S904, the special color toner plate RIP process is executed. At step S905, the special color plate RIP process is executed.

Here, since the CMYK plate RIP process of step S901 is the same as the process illustrated in FIG. 6 according to the exemplary embodiment 1, the description will be omitted. Since the special color plate RIP process of step S905 is the same as the process illustrated in FIG. 7 according to the exemplary embodiment 1, the description will be omitted.

[Special Color Toner Plate RIP Process]

Figure 10:
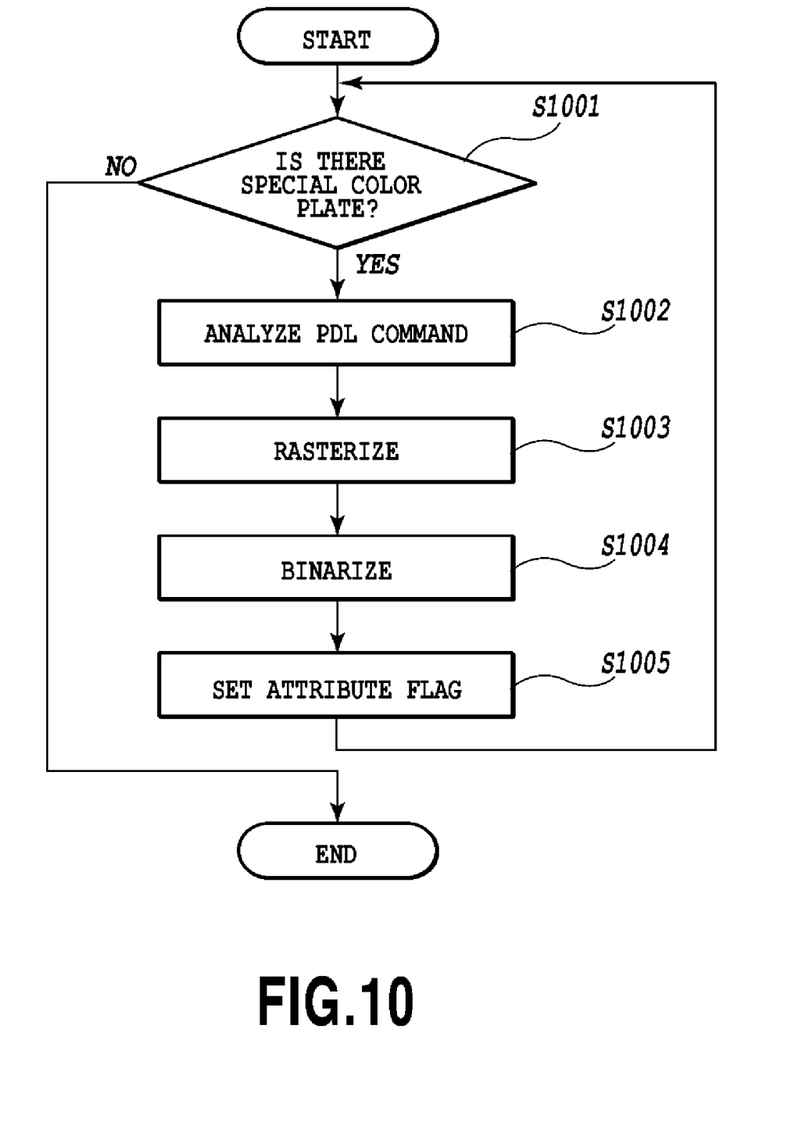
FIG. 10 is a flowchart of the RIP process according to the exemplary embodiment 2.

FIG. 10 illustrates a flowchart of the special color toner plate RIP process of step S904. Here, the flowchart illustrated in FIG. 10 is executed by the not-illustrated CPU of the image processing system according to the present invention.

At step S1001, it is checked whether or not there exists the special color plate. At step S1001, when there exists the special color plate, the process proceeds to step S1002. At step S1001, when there does not exist the special color plate, the process is terminated. At step S1002, the command of the special color plate transmitted to the PDL controller 103 is analyzed. At step S1003, the rasterizing is executed, and the output image data is generated. In the special color toner plate RIP process, since the output image is not applied to the CMYK plate, the object determining process is not necessary. At step S1004, the binarizing is executed. The binarizing is such a simple binarizing that "1" is set for the pixel including the special color toner data in the rasterizing of step S1003. At step S1005, a result of the binarizing is set to the clear toner attribute of the Bit 6 or the fluorescence toner attribute of the Bit 5 in the attribute flag based on a result of the process of step S1004. Next, the process returns to step S1001.

The attribute flag is configured with the attribute information of the Bit 0-Bit 1, the Bit 3, the Bit 4, the Bit 5, and the Bit 6. Here, the Bit 0-Bit 1 includes the object attribute (character 00, image 01, and graphics 10). The Bit 3 includes the ground attribute ("1" is set in a background unit). The Bit 4 includes the high-definition character process flag ("1" is set when a high-definition character image process is executed as a character for an object). The Bit 5 includes a fluorescence toner attribute ("1" is set when the fluorescence toner is used). The Bit 6 includes the clear toner attribute ("1" is set when the clear toner is used).

Hereinafter, the printing apparatus 102 generates the fluorescence toner plate and the clear toner plate from information on the fluorescence toner attribute and the clear toner attribute of the attribute flag, and executes the printing.

In the present exemplary embodiment, there exists such an advantageous effect that the printing can be executed for the special color plates whose number of colors is two or more.

Exemplary Embodiment 3

At step S803 of the binarizing of the clear toner plate RIP process of the exemplary embodiment 1, such a simple binarizing is executed that "1" is set to the pixel including data. Here, the binarizing is executed by the dizer process, the error diffusion process, or the like, and may be set as pseudo-tone binary data to the clear toner attribute of the attribute flag.

Since the special color plate data transferred from the client computer 101 is a multi-value data, there exists such an advantageous effect that the clear toner plate of the printing apparatus 102 can be generated by utilizing the tone of the clear toner plate generated by the user.

Exemplary Embodiment 4

In the exemplary embodiment 1 and the exemplary embodiment 2, the clear toner plate and the special color plate can be printed with the toner other than the CMYK colors as being always embedded in the attribute information. In the printing apparatus 102, even when the image data of the special color plate can be directly processed by the printing apparatus 102, a function for inputting the special color plate information to the attribute information of the present invention may be operated by the PDL controller 103. In this case, there exists such an advantageous effect that the PDL controller 103 includes the video channels whose number corresponds to that of the special colors, also incorporates a system for converting the special color plate information to the attribute data, and can switch the special color plate processing method according to a type of the printing apparatus 102 to be connected.

According to the present exemplary embodiment, there exists such an advantageous effect that, even if an interface of the special color plate of the printing apparatus 102 is different, the special color plate can be printed by the same PDL controller 103.

Meanwhile, the present invention may be applied to a system configured with a plurality of devices (for example, a host computer, an interface device, a reader, a printer, and the like), and may be also applied to an apparatus configured with a single device (for example, a copying machine, a facsimile apparatus, and the like).

A recording medium, which records a program code of software for realizing a function of the above exemplary embodiment, is delivered to a system or an apparatus, and a computer (a CPU or a MPU) of the system or the apparatus reads and executes the program code stored in the recording medium. It is apparent that an object of the present invention can be also achieved by such a method.

In this case, since the program code itself read from the computer-readable recording medium realizes the function of the above exemplary embodiment, the recording medium storing the program code is configured in the present invention.

The following recording media can be, for example, used to deliver this program code: a flexible disk, a hard disk, an optical disk, a magnet-optical disk, a CD-ROM, a CD-R, a magnetic tape, a nonvolatile memory card, a ROM and the like.

It is apparent that, since the computer executes the read program code, the function of the above exemplary embodiment is realized, and the following case is also included. That is, based on an instruction of the program code, an OS (Operating System) running on the computer, or the like executes a part or all of the actual process, and the function of the above exemplary embodiment is realized by the process.

It is apparent that the following case is also included. The program code read from the recording medium is written to a memory included in a function expansion board inserted to the computer or a function expansion unit connected to the computer. After that, based on the instruction of the program code, the CPU, which is included in the function expansion board or the function expansion unit, or the like executes a part or all of the actual process, and the function of the above exemplary embodiment is realized by the process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-199492, filed Jul. 31, 2007, and 2008-183901, filed Jul. 15, 2008, which are hereby incorporated by reference herein in their entirety.

What is claimed is:

1. A control apparatus, comprising:
   a selecting unit configured to select, upon previewing image data before printing using data indicating whether or not each pixel of the image data is to be recorded by a clear recording agent, whether or not a pixel to be recorded by the clear recording agent is displayed;
   a display control unit configured, in a case where it is selected that a pixel to be recorded by the clear recording agent is displayed by the selecting unit, and in order to display in a display device a pixel to be recorded by the clear recording agent among rendered image data using a predetermined color designated, to output an image in which a color of a pixel to be recorded by the clear recording agent is replaced with the predetermined color, and
   in a case where it is selected that a pixel to be recorded by the clear recording agent is not displayed by selecting unit, to control such that a pixel to be recorded by the clear recording agent is not displayed in the display device.

2. The control apparatus according to claim 1, wherein the predetermined color is a special color.

3. The control apparatus according to claim 1, wherein a plurality of special colors are selected for the predetermined color.

4. The control apparatus according to claim 1, wherein the clear recording agent does not include a color tone.

5. A controlling method, comprising:
   upon previewing image data before printing using data indicating whether or not each pixel of the image data is to be recorded by a clear recording agent, selecting whether or not a pixel to be recorded by the clear recording agent is displayed;
   in a case where it is selected that a pixel to be recorded by the clear recording agent is displayed in the selecting step, and in order to display in a display device a pixel to be recorded by the clear recording agent among rendered image data using a predetermined color designated, outputting an image in which a color of a pixel to be recorded by the clear recording agent is replaced with the predetermined color; and
   in a case where it is selected that a pixel to be recorded by the clear recording agent is not displayed in the selecting step, controlling such that a pixel to be recorded by the clear recording agent is not displayed in the display device.

6. The controlling method according to claim 5, wherein the predetermined color is a special color.

7. The controlling method according to claim 5, wherein a plurality of special colors are selected for the predetermined color.

8. The controlling method according to claim 5, wherein the clear recording agent does not include a color tone.

9. A non-transitory computer-readable recording medium, recording a program causing a computer to execute the controlling method according to claim 5.

* * * * *